United States Patent Office 2,755,225
Patented July 17, 1956

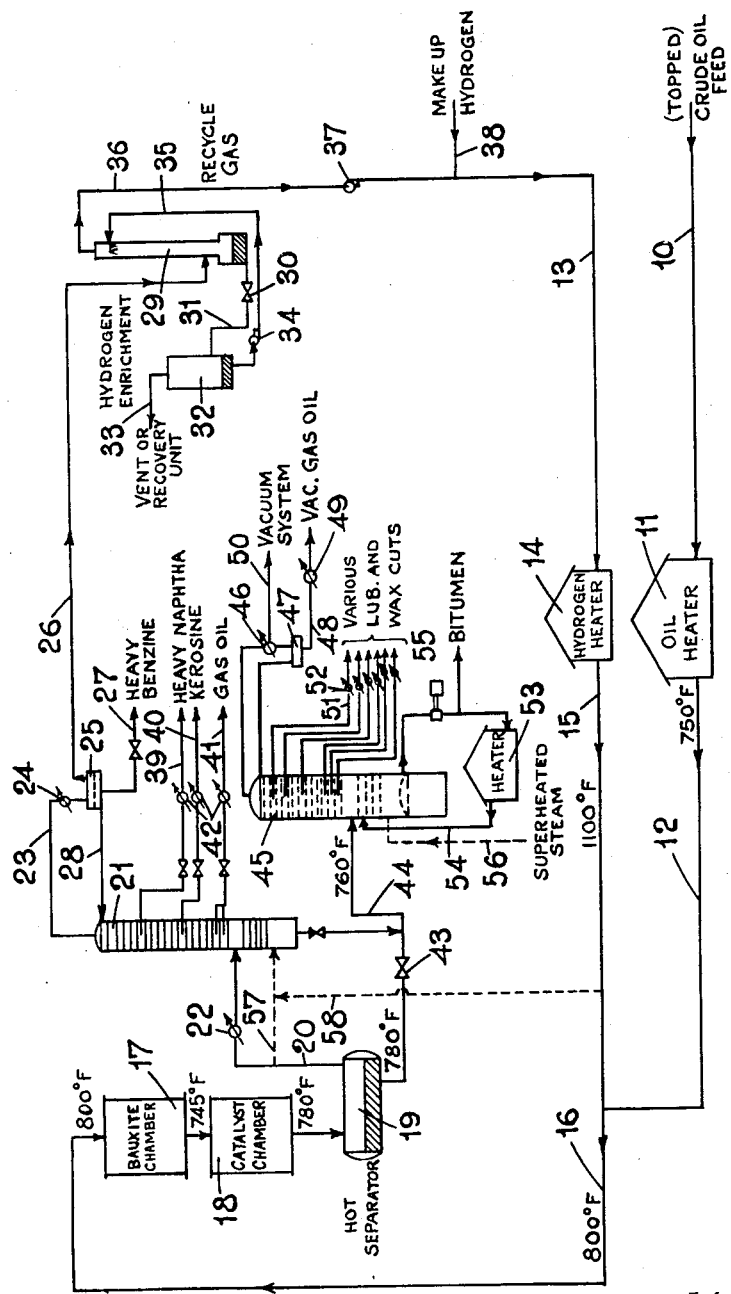

2,755,225

TREATMENT OF CRUDE PETROLEUM

Frederick William Bertram Porter and John Welford Hyde, Sunbury-on-Thames, England, assignors to The British Petroleum Company Limited Application September 30, 1952, Serial No. 312,384

Claims priority, application Great Britain October 18, 1951

9 Claims. (Cl. 196—24)

This invention relates to the treatment of crude petroleum.

Crude petroleum is conventionally distilled for the production of various fractions from which marketable products may be prepared, after which there remains a residue which is of comparatively little value. It is obviously desirable that the amount of residue remaining after the separation of the desired fractions should be kept as low as possible. The more important fractions that are recovered from the crude petroleum includes the gasoline, kerosine and gas oil fractions, and such fractions invariably require further treatment in order to convert them into marketable products. In particular they must be treated for the removal of sulphur.

Various processes have been proposed for the removal of sulphur from petroleum distillates and residues including the so-called hydrofining process in which the distillate or residue is passed in admixture with hydrogen over a sulphur-resistant hydrogenation catalyst at elevated temperature and pressure such that the sulphur is converted into hydrogen sulphide which may easily be removed from the treated distillate or residue. It is known to subject heavy petroleum oils to treatment with hydrogen at high pressures of the order of 300 to 700 atmospheres whereby the oils are broken down into lower boiling materials such as gasolines and gas oils. In such processes, the hydrogen consumption amounts to between 2000 and 6000 C. F./B., whereas in the hydrofining process, in which the hydrogenation is controlled so that it is largely confined to the hydrogenation of organic sulphur compounds, the hydrogen consumption is very much lower.

It has been found that the hydrofining process may be applied to crude petroleum and in addition to the advantage obtained that none of the distillates recovered from the hydrofined crude needs further treatment for sulphur removal, there is the further advantage that the amount of residue obtained on distillation of the hydrofined crude is considerably reduced with a corresponding increase in the amount of the distillate fractions removed. The residue recovered from the hydrofined crude has a low sulphur content and a low viscosity and is suitable for use as a fuel oil without the necessity of being blended with gas oils or other components to reduce its viscosity. In some industrial processes, the use of residues containing a high proportion of sulphur is precluded, so that the present invention provides a residue fuel suitable for use in such processes.

The temperature should preferably be maintained within the range of 750° to 850° F. and the pressure within the range 500 to 1500 lbs./sq. in.

The most effective catalyst for the hydrofining of crude oil consists of the so-called cobalt molybdate type comprising the oxides of cobalt and moylbdenum deposited on or incorporated with a support. In particular, a catalyst consisting of the oxides of cobalt and molybdenum deposited on or incorporated with alumina has been found to be particularly effective.

Such a process is described in the specification of copending application Ser. No. 245,046, now abandoned. As therein described, the liquid product from the reaction zone is first cooled under plant pressure for the separation of the bulk of the hydrogen, and is then passed to a low pressure separator for the separation of the remainder of the hydrogen in admixture with light hydrocarbons and then to a flash tower for the separation of the hydrogen sulphide. The desulphurised crude oil is then passed to a conventional distillation unit wherein the crude oil is again heated. It will thus been seen that the crude oil is heated before entering the hydrofining reaction zone, is cooled after leaving said zone and heated again on distillation. The present invention seeks to make the hydrofining of crude oil more economic by reducing the amount of heat required for the desulphurisation and distillation of the oil.

According to the present invention, the gaseous and liquid components of the products from the hydrofining zone are separated from each other without substantial reduction of temperature or pressure and are passed to distillation zones for the recovery of desired products.

By operating in this way, the necessity for reheating the desulphurised crude oil prior to distillation is avoided.

In carrying the invention into effect, the products from the hydrofining zone are separated without substantial reduction of temperature or pressure into a gaseous fraction comprising the hydrogen sulphide formed in the reaction and all the components of the crude oil normally recovered in an atmospheric distillation column, together with the recycle hydrogen, and said gaseous fraction is passed, if desired after cooling, to a distillation column operating under the hydrofining pressure, while the liquid fraction is passed to a vacuum distillation column operating under conventional conditions. If desired, the pressure of the liquid fraction may be reduced to atmospheric before the fraction is passed to the vacuum distillation column in order to separate the gaseous components which might adversely affect the operation of the vacuum column.

The invention will now be described by way of example with reference to the accompanying flow diagram.

Crude oil, which may be topped, is fed via line 10 to heater 11 from which it emerges via line 12 at a temperature of approximately 750° F. Hydrogen is fed via line 13 to heater 14 from which it emerges via line 15 at a temperature of approximately 1100° F. The streams of oil and hydrogen unite in line 16 giving a combined stream at approximtaely 800° F. The oil/gas stream then passed to a guard chamber 17 wherein the oil is contacted with a bauxite catalyst in order to remove traces of metals such as sodium and vanadium from the oil as described in the specification of copending application (Ser. No. 276,256. The temperature of the stream leaving the guard chamber 17 is approximately 745° F. and the stream then passes to the reactor 18 wherein it is contacted with a cobalt molybdate type catalyst. The products leaving the reactor 18 are at a temperature of approximately 780° F. and pass direct to a separator 19 without reduction of temperature or pressure. The gaseous components leave the separator 19 via line 20 and enter the distillation column 21 operating under plant pressure. If desired, the gaseous components may be cooled by means of cooler 22.

The gaseous components may enter the base of the column via line 57 and hydrogen may also be passed into the base of the column via line 58. The overhead fraction from the column 21 passes via line 23 to the cooler 24 and thence to a separator 25 operating under plant pressure from which a gaseous product consisting of hydrogen, hydrogen sulphide and light hydrocarbons is removed via line 26 and a liquid product consisting of heavy benzine via line 27. Some of the liquid product from separator 25 is returned to the column 21 via the line 28 as reflux. The gaseous mixture from the separator 25 is passed via line 26 to tower 29 operating under plant pressure and atmospheric temperature, wherein it is scrubbed with a liquid such as gas oil or kerosine, which absorbs hydrogen sulphide and light hydrocarbons, the rich absorbent passing from the base of the tower 29 via reducing valve 30 and line 31 to a flash chamber 32 operating at atmospheric temperature and pressure wherein the hydrogen sulphide and light hydrocarbons are separated and passed via line 33 to vent or to a recovery unit. The lean absorbent is returned via pump 34 and line 25 to the tower 29. The gas leaving the top of the tower 29 via line 36 is relatively enriched in hydrogen and is recycled by means of pump 37 and line 13 to the heater 14, make-up hydrogen being added via line 38.

Side streams may be removed from the column 21 as desired. As shown, three streams, 39, 40 and 41 consisting respectively of heavy naphtha, kerosine and gas oil are removed, each stream passing through a heat exchanger 42.

The liquid product from the separator 19 is let down to atmospheric pressure via a reducing valve 43 and passes via line 44 to a vacuum distillation column 45. The residue from the column 21 is likewise let down to atmospheric pressure and passes into line 44 and thence to the column 45, the combined streams being at a temperature on entering the column of approximately 760° F. If desired, the combined streams from the separator 19 and the column 21 may be passed to an atmospheric separator before being passed to the vacuum column 45. The overhead product from the column 45 passes through the cooler 46 and thence into a receiver 47 from which the product consisting of a vacuum gas oil is removed via line 48 and cooler 49. Vacuum is applied to the column through line 50. Various side streams for use in the production of lubricating oils and waxes are removed from the column 45 via lines 51 and coolers 52. The bottom product from the column 45 is passed through the heater 53 and returned to the column via line 54, a bitumen product being withdrawn from line 55. Superheated steam may be admitted to the column 55 via line 56.

The following is a specific example of the results obtained by treating a Kuwait crude in the apparatus just described.

Hydrofining conditions:
  Catalysts:
    Guard chamber _____ Indian bauxite.
    Reactor _____ Oxides of cobalt and molybdenum on alumina.
  Temperature _____ 780° F.
  Pressure _____ 100 p. s. i. ga.
  Space velocity _____ 2.0 v./v./hr.
  Gas recycle rate _____ 4000 S. C. F./B.
  Hydrogen consumption ___ 300 S. C. F./B.
  Processing period _____ 100 hours.
  Catalyst age _____ 200 hours.
  Sulphur content of fuel __ 2.51% wt.
  Sulphur content of
    product _____ 0.73% wt.
  Sulphur removal _____ 70.9%.

The yields and sulphur contents of the various fractions obtained by distillation of the hydrofined crude were as follows:

| Fraction | Feed | Product |
|---|---|---|
| Gas to C₄ _____ percent wt__ | 1.1 | ¹ 4.3 |
| Gasoline to 149° C _____do____ | 14.1 | 14.0 |
| Total Sulphur _____do____ | 0.02 | 0.009 |
| Kerosene 149-232° C _____do____ | 12.6 | 14.8 |
| Total Sulphur _____do____ | 0.168 | 0.031 |
| Gas Oil 232-371° C _____do____ | 20.8 | 25.6 |
| Total Sulphur _____do____ | 1.45 | 0.38 |
| Residue above 371° C _____do____ | 51.4 | 41.3 |
| Total Sulphur _____do____ | 4.17 | 1.28 |
| Waxy Distillate, 350-550° C _____do____ | 26.6 | 30.5 |
| Total Sulphur _____do____ | 2.91 | 0.9 |
| Residue above 550° C _____do____ | 28.2 | 13.2 |
| Total Sulphur _____do____ | 5.12 | 2.4 |

¹ Includes 1.9% wt. H₂S.

We claim:

1. A process for the recovery from crude petroleum of products having a substantially reduced sulphur content, which comprises hydrofining the crude petroleum by passing it to a hydrofining zone wherein the crude petroleum is contacted in the presence of hydrogen with a sulphur-resistant hydrogenation catalyst at a temperature in the range 750–850° F. and at a pressure within the range 500–1500 lb./sq. in. whereby organically combined sulphur contained in the crude petroleum is converted into hydrogen sulphide, separating the products from the hydrofining zone without substantial reduction of temperature or pressure into a gaseous fraction comprising the hydrogen sulphide formed in the hydrofining zone, hydrogen, and all the components of the crude oil normally recovered in an atmospheric distillation column, and a liquid fraction comprising the remainder of said products, passing said gaseous fraction to a distillation column operating under the pressure prevailing in the hydrofining zone, and passing said liquid fraction to a vacuum distillation column.

2. A process for the recovery from crude petroleum of products having a substantially reduced sulphur content, which comprises hydrofining the crude petroleum by passing it to a hydrofining zone wherein the crude petroleum is contacted in the presence of hydrogen with a sulphur-resistant hydrogenation catalyst at a temperature in the range 750–850° F. and at a pressure within the range 500–1500 lb./sq. in. whereby organically combined sulphur contained in the crude petroleum is converted into hydrogen sulphide, separating the products from the hydrofining zone without substantial reduction of temperature or pressure into a gaseous fraction comprising the hydrogen sulphide formed in the hydrofining zone, hydrogen, and the naphtha, kerosene and gas oil fractions of the crude petroleum, and a liquid fraction comprising the remainder of said products, passing said gaseous fraction to a distillation column operating under the pressure prevailing in the hydrofining zone, and passing said liquid fraction to a vacuum distillation column.

3. A process for the recovery from crude petroleum of products having a substantially reduced sulphur content, which comprises hydrofining the crude petroleum by passing it to a hydrofining zone wherein the crude petroleum is contacted in the presence of hydrogen with a sulphur-resistant hydrogenation catalyst at a temperature in the range 750–850° F. and at a pressure within the range 500–1500 lb./sq. in. whereby organically combined sulphur contained in the crude petroleum is converted into hydrogen sulphide, separating the products from the hydrofining zone without substantial reduction of temperature or pressure into a gaseous fraction comprising the hydrogen sulphide formed in the hydrofining zone, hydrogen, and all the components of the crude oil normally recovered in an atmospheric distillation column, and a liquid fraction comprising the remainder of said products, passing said gaseous fraction to a distillation column operating under the pressure prevailing in the hydrofining zone, reducing the pressure of said liquid fraction to atmospheric pressure, and passing said liquid fraction to a vacuum distillation column.

4. A process for the recovery from crude petroleum of products having a substantially reduced sulphur content, which comprises hydrofining the crude petroleum by passing it to a hydrofining zone wherein the crude petroleum is contacted in the presence of hydrogen with a sulphur-resistant hydrogenation catalyst at a temperature in the range 750–850° F. and at a pressure within the range 500–1500 lb./sq. in. whereby organically combined sulphur contained in the crude petroleum is converted into hydrogen sulphide, separating the products from the hydrofining zone without substantial reduction of temperature or pressure into a gaseous fraction comprising the hydrogen sulphide formed in the hydrofining zone, hydrogen, and all the components of the crude oil normally recovered in an atmospheric distillation column, and a liquid fraction comprising the remainder of said products, cooling said gaseous fraction, passing said gaseous fraction to a distillation column operating under the pressure prevailing in the hydrofining zone, and passing said liquid fraction to a vacuum distillation column.

5. A process for the recovery from crude petroleum of products having a substantially reduced sulphur content, which comprises hydrofining the crude petroleum by passing it to a hydrofining zone wherein the crude petroleum is contacted in the presence of hydrogen with a sulphur-resistant hydrogenation catalyst at a temperature in the range 750–850° F. and at a pressure within the range 500–1500 lb./sq. in. whereby organically combined sulphur contained in the crude petroleum is converted into hydrogen sulphide, separating the products from the hydrofining zone without substantial reduction of temperature or pressure into a gaseous fraction comprising the hydrogen sulphide formed in the hydrofining zone, hydrogen, and the naphtha, kerosene and gas oil fractions of the crude petroleum, and a liquid fraction comprising the remainder of said products, cooling said gaseous fraction, passing said gaseous fraction to a distillation column operating under the pressure prevailing in the hydrofining zone, reducing said liquid fraction to atmospheric pressure, and passing said fraction to a vacuum distillation column.

6. A process according to claim 1, wherein the catalyst in the hydrofining zone consists of or comprises the oxides of cobalt and molybdenum deposited on or incorporated with a support.

7. A process according to claim 6, wherein the support consists of or comprises alumina.

8. A process according to claim 1, wherein, prior to being passed over the hydrofining catalyst, the crude oil is passed over a contact material for the removal of sodium and vanadium from the oil.

9. A process according to claim 8, wherein said contact material comprises bauxite.

References Cited in the file of this patent

UNITED STATES PATENTS

| | | |
|---|---|---|
| 2,340,922 | Bent et al. | Feb. 8, 1944 |
| 2,392,579 | Cole | Jan. 8, 1946 |
| 2,441,297 | Stirton | May 11, 1948 |
| 2,516,877 | Horne et al. | Aug. 1, 1950 |
| 2,531,767 | Chenicek | Nov. 28, 1950 |
| 2,560,415 | Cornell | July 10, 1951 |
| 2,560,433 | Gilbert et al. | July 10, 1951 |
| 2,574,449 | Lorne et al. | Nov. 6, 1951 |
| 2,614,066 | Cornell | Oct. 14, 1952 |